(12) United States Patent
Wong et al.

(10) Patent No.: US 8,155,463 B2
(45) Date of Patent: Apr. 10, 2012

(54) PRE-PROCESSED INFORMATION EMBEDDING SYSTEM

(75) Inventors: Douglas Wong, San Diego, CA (US); Chong U. Lee, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 12/770,633

(22) Filed: Apr. 29, 2010

(65) Prior Publication Data

US 2010/0212020 A1  Aug. 19, 2010

Related U.S. Application Data

(63) Continuation of application No. 12/651,337, filed on Dec. 31, 2009, which is a continuation of application No. 11/124,465, filed on May 5, 2005, now Pat. No. 7,664,332, which is a continuation of application No. 09/721,015, filed on Nov. 22, 2000, now Pat. No. 6,912,315, which is a continuation of application No. PCT/US99/11526, filed on May 25, 1999.

(60) Provisional application No. 60/087,017, filed on May 28, 1998.

(51) Int. Cl.
*G06K 9/46* (2006.01)
(52) U.S. Cl. .......... 382/240; 382/232; 382/173
(58) Field of Classification Search .......... 382/232, 382/240, 100; 348/594; 358/409; 341/50, 341/144; 375/149, 150; 707/999.003; 704/500; 712/E9.082; 718/100; 713/176; 726/26
See application file for complete search history.

(56) References Cited

U.S. PATENT DOCUMENTS

| | | | |
|---|---|---|---|
| 4,176,379 A | 11/1979 | Wessler et al. |
| 4,199,768 A | 4/1980 | Tsujimura |
| 4,464,656 A | 8/1984 | Nakamura |
| 5,502,576 A | 3/1996 | Ramsay et al. |
| 5,519,454 A | 5/1996 | Willis |

(Continued)

FOREIGN PATENT DOCUMENTS

WO    WO-99/03340    1/1999

(Continued)

OTHER PUBLICATIONS

Advanced Access Content System (AACS), Pre-recorded Video Book, Revision 0.951, Sep. 28, 2009, 86 pages total.

(Continued)

*Primary Examiner* — Anh Hong Do
(74) *Attorney, Agent, or Firm* — Perkins Coie LLP; Donald L. Wenskay

(57) ABSTRACT

Auxiliary information (150) representing binary or multi-level (M≧2) logical values is embedded into successive segments (110) of an audio, video or other data signal in response to a user request to download the data signal via an on-line distributor (350) on a computer network such as the Internet. To avoid unnecessary delays in providing the data signal to the user, the data signal is pre-processed to provide two sets or copies of data (230, 235). One set (230) of the data contains segments with an embedded binary "0", while the other set (235) contains corresponding segments with an embedded binary "1". Successive segments are selected from one of the two sets to provide a time-multiplexed composite data signal (230) that has the desired content, but with an embedded binary data sequence that identifies the user.

42 Claims, 12 Drawing Sheets

U.S. PATENT DOCUMENTS

| | | |
|---|---|---|
| 5,636,292 A | 6/1997 | Rhoads |
| 5,687,191 A | 11/1997 | Lee |
| 5,719,937 A | 2/1998 | Warren |
| 5,822,360 A | 10/1998 | Lee |
| 5,893,067 A | 4/1999 | Bender et al. |
| 5,901,178 A | 5/1999 | Lee |
| 5,937,000 A | 8/1999 | Lee et al. |
| 5,940,135 A | 8/1999 | Petrovic et al. |
| 5,940,429 A | 8/1999 | Lam et al. |
| 5,963,909 A | 10/1999 | Warren et al. |
| 6,145,081 A | 11/2000 | Winograd et al. |
| 6,189,123 B1 | 2/2001 | Anders Nystrom et al. |
| 6,268,866 B1 | 7/2001 | Shibata |
| 6,285,774 B1 | 9/2001 | Schumann et al. |
| 6,332,194 B1 | 12/2001 | Bloom et al. |
| 6,400,826 B1 | 6/2002 | Chen et al. |
| 6,430,301 B1 | 8/2002 | Petrovic |
| 6,553,127 B1 | 4/2003 | Kurowski |
| 6,625,297 B1 | 9/2003 | Bradley |
| 6,792,542 B1 | 9/2004 | Lee et al. |
| 6,912,315 B1 | 6/2005 | Wong et al. |
| 6,915,481 B1 | 7/2005 | Tewfik et al. |
| 7,068,809 B2 | 6/2006 | Stach |
| 7,630,497 B2 | 12/2009 | Lotspiech et al. |
| 7,644,282 B2 * | 1/2010 | Petrovic et al. ............... 713/176 |
| 7,664,332 B2 | 2/2010 | Wong et al. |
| 2002/0033844 A1 | 3/2002 | Levy et al. |
| 2003/0031317 A1 | 2/2003 | Epstein |
| 2003/0187679 A1 | 10/2003 | Odgers et al. |

FOREIGN PATENT DOCUMENTS

| | | |
|---|---|---|
| WO | WO-99/62022 | 12/1999 |

OTHER PUBLICATIONS

Aggarwal, et al. "Multi-Layer Grid Embeddings," IEEE, 1985, pp. 186-196.

International Search Report for PCT Application No. PCT/US06/25090 dated May 13, 2008.

Das et al., "Distributed Priority Queues on Hybercube Architectures" IEEE, 1996, pp. 620-627.

http://www.cryptography.com/technology/spdc/index.html.

Kocher, P., et al., "Self-Protecting Digital Content", Technical Report from the CRI Content Security Research Initiative. Cryptography Research, Inc. (CRI), 2002-2003, 14 pages.

Lotspiech, J. "The Advanced Access Content System's Use of Digital Watermarking." MCPS '06, Oct. 28, 2006, pp. 19-21.

* cited by examiner

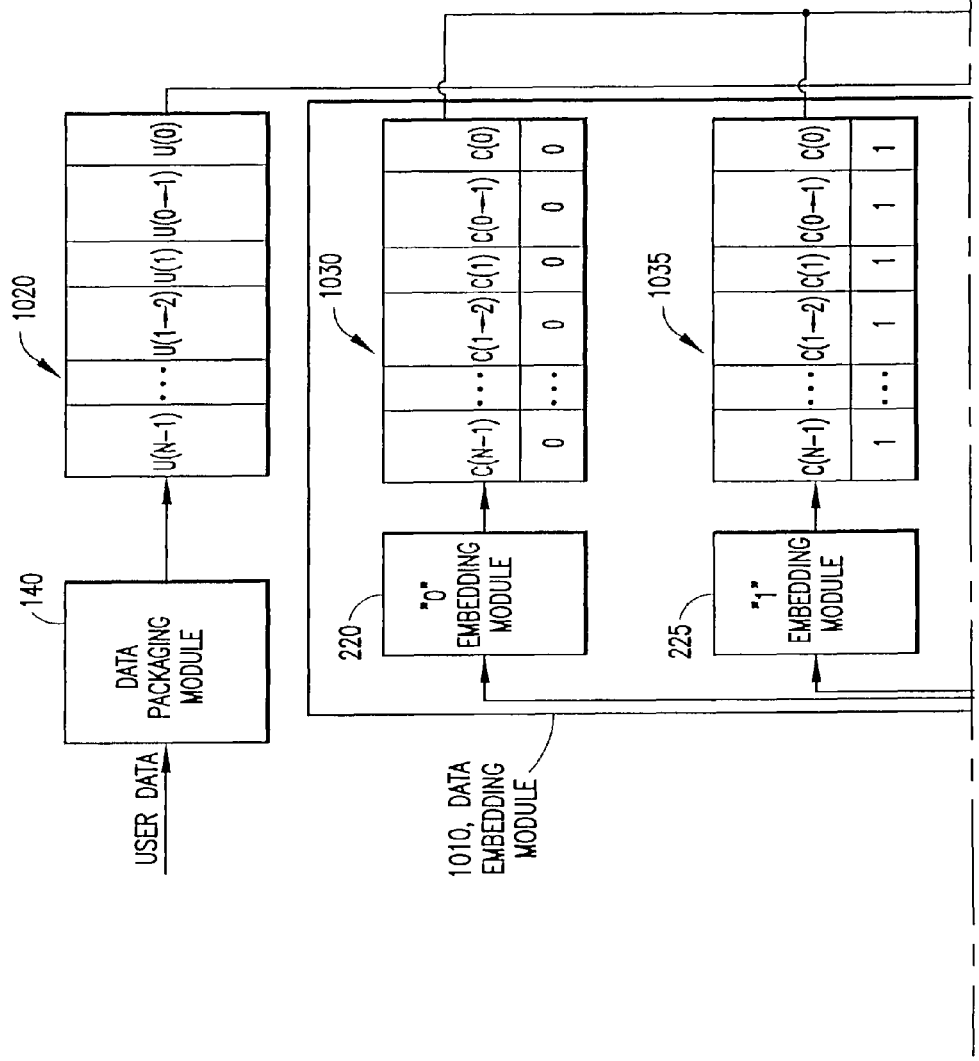

PRE-PROCESSED INFORMATION EMBEDDING SYSTEM

CROSS-REFERENCE TO RELATED PATENT APPLICATIONS

This application is a Continuation of U.S. patent application Ser. No. 12/651,337, filed on Dec. 31, 2009, which is a Continuation of U.S. patent application Ser. No. 11/124,465, filed May 5, 2005, now U.S. Pat. No. 7,664,332, incorporated herein by reference in its entirety, which is a Continuation of U.S. patent application Ser. No. 09/721,015, filed Nov. 22, 2000, now U.S. Pat. No. 6,912,315, incorporated herein by reference in its entirety, which is a Continuation of International Application No. PCT/US99/11526, filed May 25, 1999, incorporated herein by reference in its entirety, which claims priority from U.S. Provisional Patent Application Ser. No. 60/087,017, filed May 28, 1998, incorporated herein by reference in its entirety.

BACKGROUND OF THE INVENTION

The present invention relates to a method and apparatus for providing digital or analog content, such as audio or video, with copy protection data embedded therein.

The ability to transmit copyrighted, namely entertainment content, directly to a typical consumer is increasing rapidly. This is especially true using the Internet, pay-per-view or pay-per-listen systems for cable television networks, and other means.

This increased ability brings with it a number of advantages to reaching the consumer. For example, the consumer may sample the content (e.g., audio or video) while on-line, and purchase the content at any time of the day. However, one clear disadvantage of such systems is that the operator provides each consumer with a high quality (typically digital) master copy of the content. Under most circumstances, this is only a matter of providing high quality entertainment to the consumer. Unfortunately, however, for the unscrupulous consumer (e.g., pirate), this provides a means to generate illegal copies of content with little effort.

Of particular issue is the potential for unauthorized copying and widespread distribution of content, e.g., via a computer network such as the Internet. Traditional unauthorized dubbing and distribution of multiple copies of storage media, such as compact disc, digital video disc, or magnetic tape, is also a problem. In any case, it would be desirable to include information on a copy that is initially transmitted to a consumer that designates that specific copy as belonging to a particular recipient.

Letting the intended recipient know that this embedded information exists may help deter a potential pirate from making illegal use of the content. It will also allow enforcement agencies to track the source of many copies.

Even with this new found capability, the function must be economically practical. That is, a marking solution that costs more than the resultant savings from piracy is not practical. On the other hand, if a low cost solution is available, then security can be gained, and a substantial alleviation of the problem can be realized.

Accordingly, it would be desirable to provide a system for marking content in a very cost effective manner.

There are many techniques that have been proposed to embedded information into content. Each has advantages and disadvantages, but the common aspect of each is that some computation is required. Processing hardware must be adequate to perform the necessary computations quickly enough. If the hardware is not fast enough, e.g., in responding to a user's request to download data from a network, an undesirable latency in delivery time may result. Additionally, potential restrictions in overall throughput of the transmission system may result, thereby limiting the number of users that can download data at the same time or access the network. Moreover, it may not be possible or economically feasible for the legitimate on-line distributor to obtain faster hardware.

Accordingly, it would be desirable to provide a system which reduces the real-time computational requirements for embedding copy protect data into digital or analog content (e.g., audio, video, computer games, information services such a stock prices and weather data, on-line shopping ore-commerce data, etc.).

It would be desirable to provide a system for pre-processing a select number of copies of the same content, and then dynamically choosing from these pre-processed copies in order to create a properly encoded composite signal which is suitable, e.g., for downloading by a user.

The system should provide the capability to distribute the pre-processed content to multiple users at the same time, where the encoded composite signal is generated at the user's location according to an ID value provided to the user.

It would be desirable to provide multiple layers of data embedding.

It would be desirable to provide binary or multi-level, non-binary data embedding.

It would be desirable to provide a technique for smoothly transitioning between two data streams.

It would be desirable to provide an on-line distribution scheme which reduces delivery delays and improves network transmission throughput.

It would be desirable to enable the content to be processed on an off-line basis, e.g., by an on-line distributor, using available hardware.

The system should be suitable for off-line distribution schemes as well, e.g., where the content is provided to the user in person, via mail, and the like. In this case, the content may be stored on a compact disc (CD), digital video disc (DVD), computer floppy disk or the like.

The present invention provides a system having the above and other advantages.

SUMMARY OF THE INVENTION

There are many applications that rely on the ability to transmit content (e.g., audio, video and/or other data). Increasingly, to protect the proprietary rights of copyright holders, including authors, performers, and others, it is necessary to mark 5 such transmissions in a manner that identifies any specific copy as belonging to a specific recipient. Preferably, the marking is provided in some secure manner. The most viable marking solution embeds information into the content, thereby reducing the likelihood of alteration or removal of the marking information.

Marking is particularly important, for example, for music, video, or other 10 digital or analog copyrighted materials that are downloaded over a computer network such as the Internet, a cable or satellite television network, or telephone network, for example. Typically, a user pays a fee to download the content, although the content may be provided free of charge, e.g., for samples or other promotional distributions of the content.

However, while the ability to download the content provides a convenience for most legitimate users, unauthorized persons, known as pirates, can illegally copy and distribute the content using a variety of techniques. This results in significant lost revenues for the content providers and on-line distributor.

In order to help track this illegal distribution, information identifying the recipient (e.g., account number, social security number, or other unique identifier) is embedded directly into the content.

The presence of the identifying information can be advertised to warn potential pirates, or can be provided without warning to help track the pirate surreptitiously.

The invention is particularly suitable for use with on-line music distribution systems, wherein users may access a distribution site, such as an Internet web site, via a computer network to purchase audio programs such as those commonly distributed at retail outlets on compact disc or magnetic tape. The invention is also suitable for use with video, images, or other content to which embedded information can be applied. For example, interactive cable television networks may allow a viewer to download digital audio or video content.

The use of the present invention by on-line music distributors is particularly relevant since piracy of recorded music has resulted insignificant lost sales for the music industry.

For on-line music distribution and other applications, one has several options for embedding information.

For example, pre-embedded copies can be stored in sufficient quantities to keep up with download requirements. For downloaded audio data, such as popular songs, this could require that many uniquely identified copies be kept on a server at the cost of increased storage.

Alternatively, information can be embedded during the transaction, e.g., as described in commonly-assigned U.S. Pat. No. 5,687,191, entitled "Post Compression Hidden Data Transport", or U.S. Pat. No. 5,822,360, entitled "Method and Apparatus for Transporting Auxiliary Data in Audio Signals." The approach described in U.S. Pat. No. 5,822,360 relies on additional computational processing, but only required copies are processed, and additional server space (e.g., memory) is not needed.

Another option, disclosed herein, requires that two copies of the content be preprocessed. The copies may be stored on a server, in which case a unique copy is constructed from the two pre-processed copies and provided to a user, typically at the time a download is requested.

For example, two server disks may be used to store each pre-processed copy of the audio. The first disk contains all copies embedded with "0's" and the second includes all copies embedded with "1's". Each server is connected to a selector function which selects one of the servers for each segment of the content to construct a composite data signal that is delivered to the user.

Based on an account number or some other unique identifier to be embedded, the selector function chooses segments from each server on a segment-by-segment basis. The output of the selector function is the copy to be delivered to the consumer.

Alternatively, the two copies of the content may be distributed to one or more users, in which case the users are provided with an appropriate processing capability to construct the unique copy. Cryptographic safeguards may be employed to ensure that the user cannot access the two copies prior to embedding the identifying data. The copies may be distributed simultaneously to the multiple users, such as for Internet multicasting of a concert or other live event.

In accordance with the present invention, a method for providing a composite data signal with successive logical values embedded therein includes the step of: preprocessing data segments to provide at least first corresponding pre-processed segments with embedded information representing a first logical value embedded therein, and second corresponding pre-processed segments with embedded information representing a second logical value that is different than the first logical value embedded therein. The first and second pre-processed segments are then optionally stored, e.g., at a server of an on-line distributor.

A control signal designating the successive logical values is provided, and in response to the control signal, particular ones of the corresponding first and second pre-processed segments are assembled to provide the composite data signal with the successive logical values embedded therein.

The first and second logical values may comprise binary bits (e.g., the first and second values may indicate zeroes and ones, respectively).

When the segments of the composite data signal include audio data, the embedded information in the composite data signal may be provided at a desired audibility level therein.

When the segments of the composite data signal include video data, the embedded information in the composite data signal may be provided at a desired visibility level therein.

The successive logical values may identify a source of the composite data signal, such as the on-line distributor.

Moreover, the control signal may be provided in response to a user request to retrieve the composite data signal, in which case the successive logical values can identify the user.

The successive logical values may be provided cryptographically, e.g., in a scrambled sequence to deter manipulation by pirates.

In the assembling step, the particular ones of the corresponding first and second pre-processed segments are time-multiplexed in response to the control signal to provide the composite data signal with the successive logical values embedded therein.

The composite data signal may be digital or analog.

Optionally, multiple layers of embedded information may be provided in the composite data signal.

In a further option, a transition between the assembled segments is smoothed according to a transition function.

Pre-smoothed transition data segments may also be provided in the composite data signal.

Binary or multi-level (M22) logical values may be provided in the composite data signal.

A corresponding apparatus and data signal are also presented.

BRIEF DESCRIPTION OF THE DRAWINGS

FIGS. 10a and 10b illustrates a system for transition control between two streams in accordance with the present invention.

DETAILED DESCRIPTION

The present invention provides a method and apparatus for embedding information into content in a manner that minimizes the computational requirements at the time of embedding. The content in this case is any form, or combination, of digital or analog audio, video, images, or other media.

This invention allows for pre-processing to be performed prior to the final processing such that an on-the-fly (e.g., real-time) embedding can be performed by choosing from specifically prepared segments and assembling a full stream. The invention is particularly suitable for an on-line distribution model, where the content is delivered via a communication channel in response to a user request.

Figure 1:
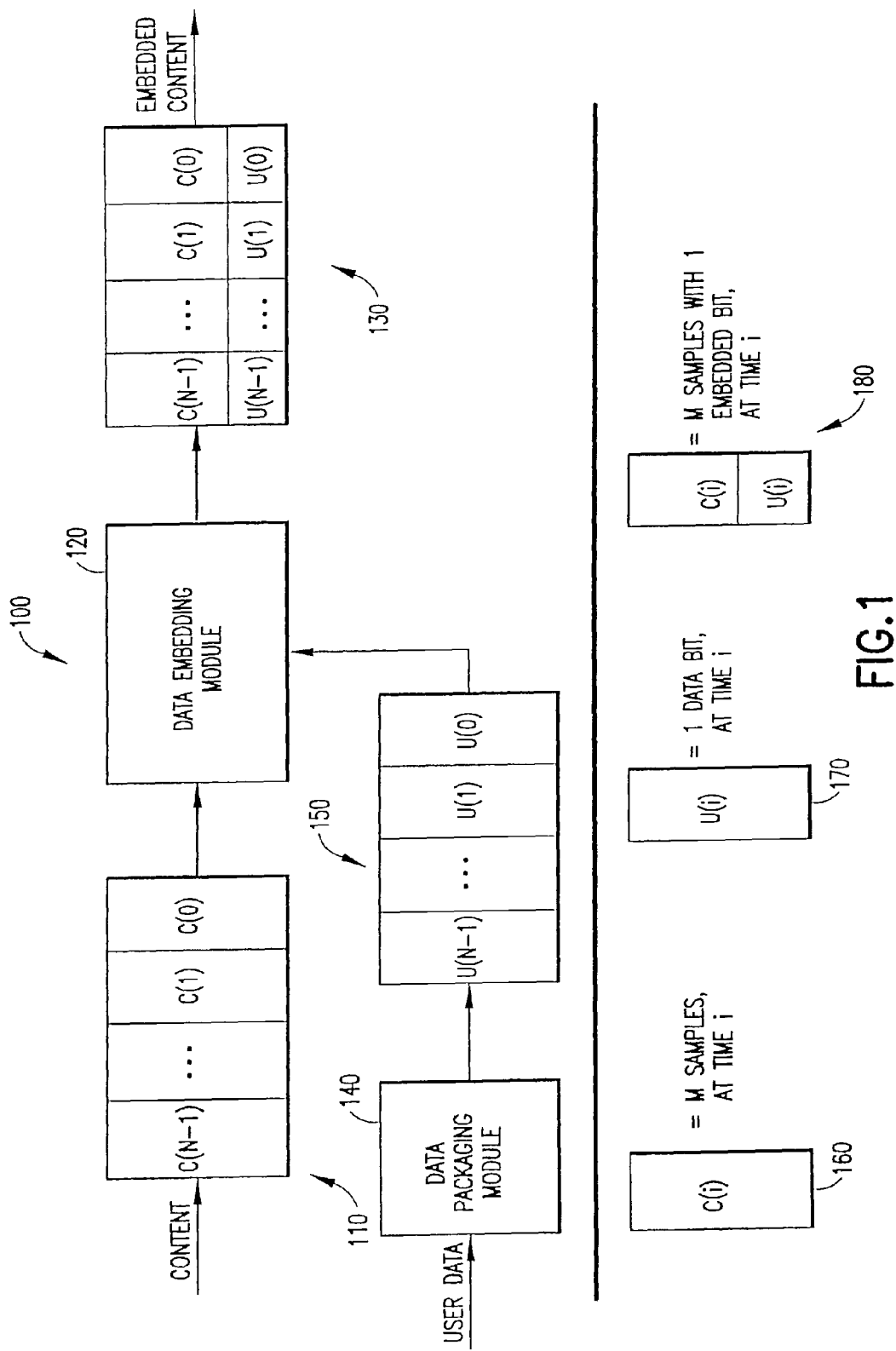
FIG. 1 illustrates a conventional data embedding system.

FIG. 1 illustrates a conventional data embedding system 100. The content where the data is to be embedded is assumed to be segmented into N frames, with M samples per frame. For example, the content is shown at 110 with frames C(N-1), . . . , C(1), C(0). User data, e.g., which identifies the user, is processed by a data packaging module 140, which converts the data into binary user data, shown generally at 150 with frames U(N-1), . . . , U(1), U(0). The module 140 can optionally add error correction code, modulation and packet header/trailers to the user data.

A data embedding module 120 aligns the packaged data (as indicated by U(0), U(1) etc. . . . ) with the respective content frame (C(0), C(1) etc. . . . ), and embeds the ith packaged data bits U(i) 170 into a corresponding ith content frame C(i) 160 to provide an ith embedded data frame 180. Successive frames of embedded content are shown at 130. The embedding process may employ any known technique, including additive techniques such as spread spectrum modulation, as well as techniques that modify the signal parameters or the features of the content itself.

The data packaging module 140 usually uses relatively little processing cycles compared with the data embedding module 120.

Figure 2:
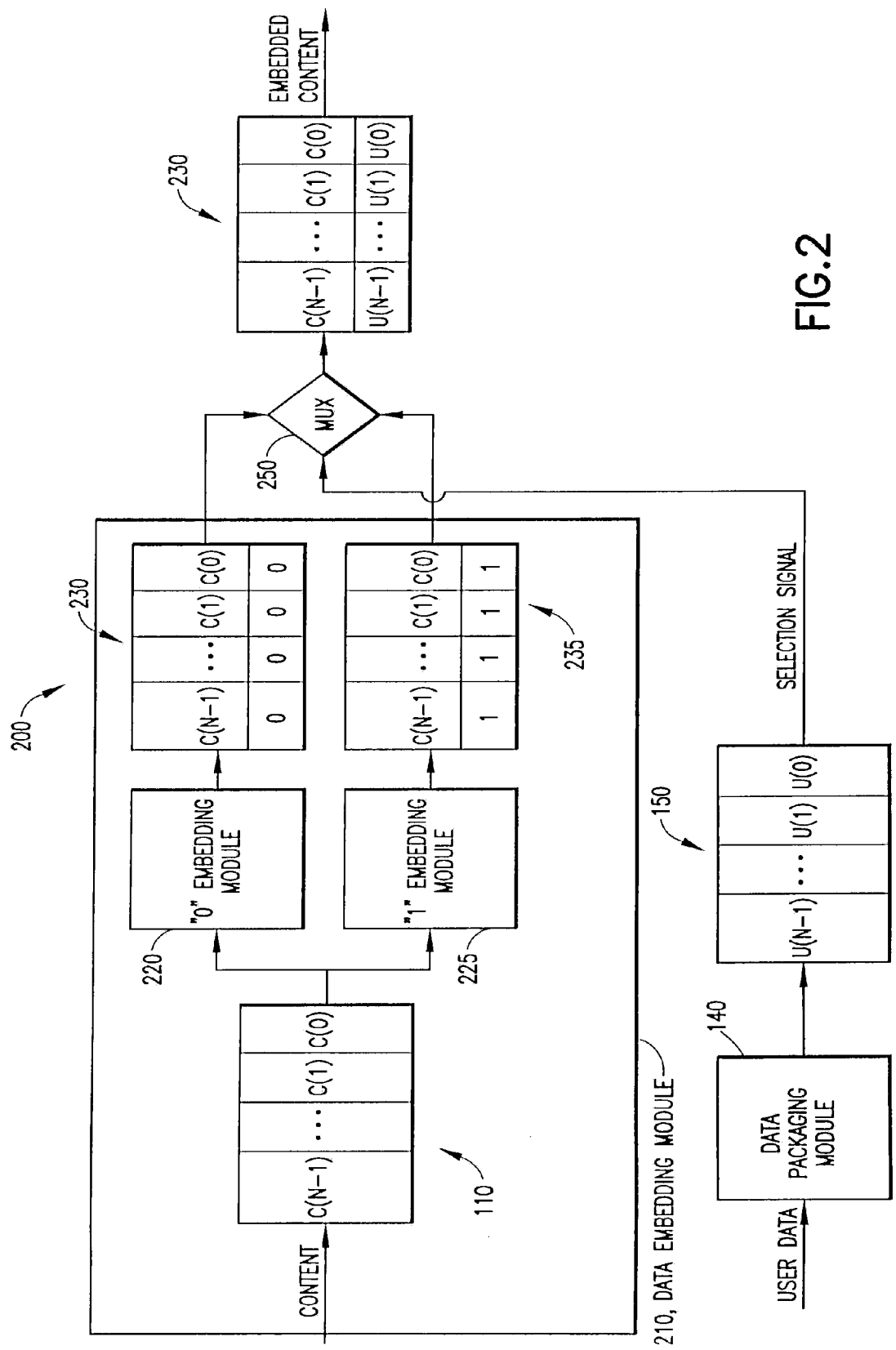
FIG. 2 illustrates a first embodiment of a data embedding system in accordance with the present invention.

FIG. 2 illustrates a first embodiment of a data embedding system 200 in accordance with the present invention.

The pre-processed data embedding system of the present invention partitions the conventional system into two steps, namely (1) pre-processed embedding, and (2) target content generation.

The data embedding module 210 receives the content stream 110 and has two output paths, one to generate a content stream 230 that embeds a binary '0', and one to generate a content stream 235 that embeds a binary '1'. The two pre-processed content streams can be multiplexed (in digital or analog domain) at a mux 250 into the respective target embedded stream 230 according to the binary user data itself, or a corresponding control signal from the data packaging module 140. If U(i) is a non-binary value, then the preprocessing stage can be increased accordingly by having more than two output paths.

This enables the generation of multiple, uniquely identified content streams with minimal processing power (by the addition of more data packaging modules), which makes the encoder 200 ideal, e.g., for use in transactional watermarking or internet multicast applications.

Figure 3:
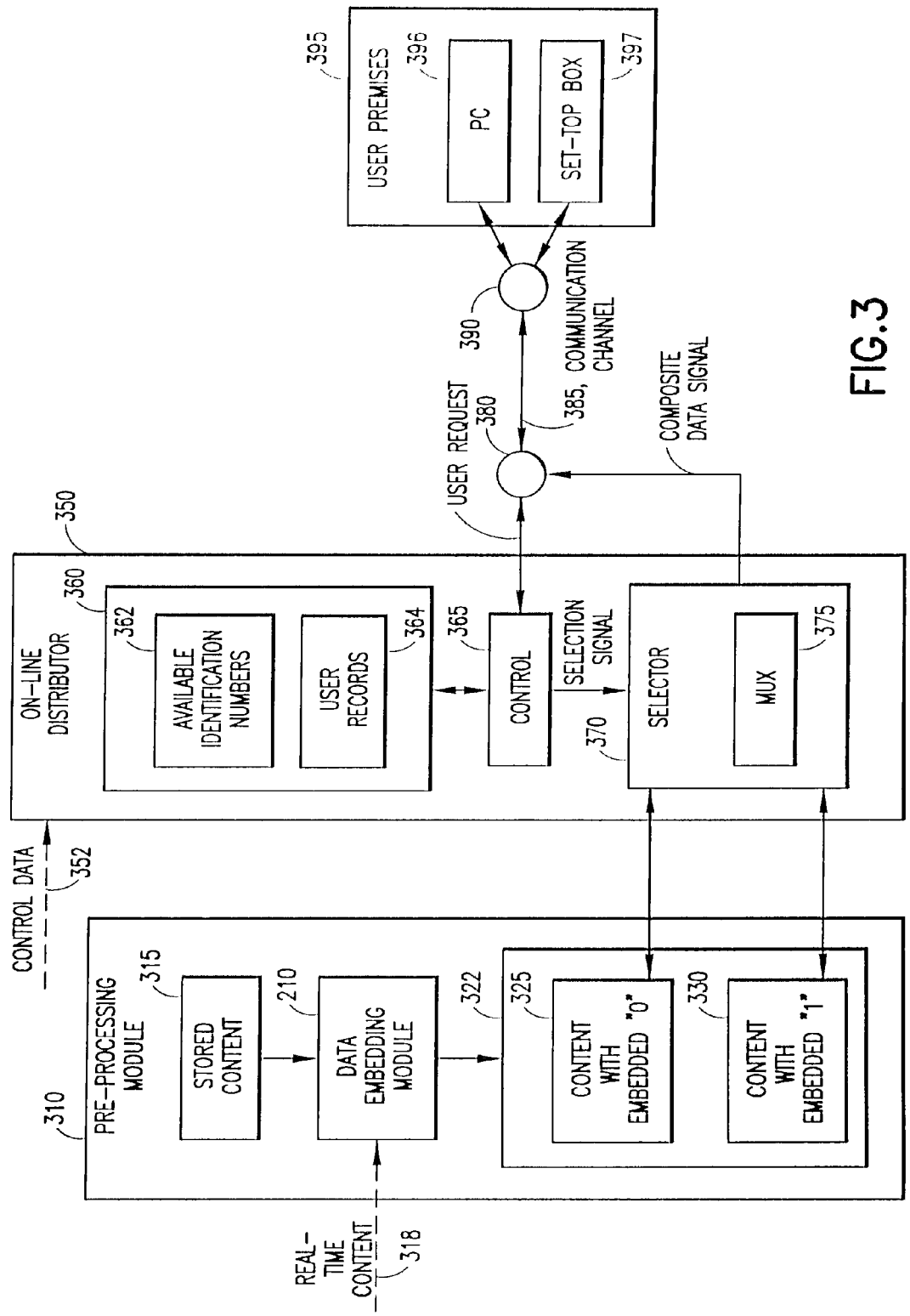
FIG. 3 illustrates a pre-processing module and on-line distribution system for distributing digital or analog content in accordance with the present invention.

FIG. 3 illustrates a pre-processing module and on-line distribution system for distributing content in accordance with the present invention. In this example, it is assumed that a user communicates with an on-line distributor 350, e.g., via a two-way Internet connection, including a communication channel 385 and nodes 380 and 390. The on-line distributor 350 also communicates with a pre-processing module 310, which is typically physically co-located with the on-line distributor 350, but may be in communication with the on-line distributor via some communication path.

The pre-processing module 310 can operate on an off-line basis, e.g., prior to when the on-line distributor fulfills an order from the user to download digital content. Optionally, the pre-processing module 310 can operate on a real-time basis, such as when a live event is received via a communication path 318, and immediately processed for multicast to a user population.

Generally, any new content stored in the content function 315 can be processed immediately upon receipt, or at some other convenient time. The content (also referred to as "primary data" or "host waveform") is provided to the data embedding module 210 to have logical values (e.g., binary zeroes and ones) embedded therein. The content can be divided temporally into a number of segments, and a logical value embedded into each segment, as discussed further in connection with FIG. 4.

The data embedding module 210 can use any known technique for embedding data into an existing signal. For example, the techniques of the following U.S. patents and patent applications, incorporated herein by reference, may be used: U.S. Pat. No. 5,822,360, entitled "Method and Apparatus for Transporting Auxiliary Data in Audio Signals"; application Ser. No. 08/764,096, filed Dec. 6, 1996 entitled "Method and Apparatus for Embedding Auxiliary Data in a Primary Data Signal"; U.S. Pat. No. 5,687,191, entitled "Post Compression Hidden Data Transport"; application Ser. No. 08/912,434, filed Aug. 18, 1997, entitled "Post Compression Hidden Data Transport for Video"; U.S. Pat. No. 5,719,937, entitled "Multi-Media Copy Management System"; application Ser. No. 08/977,719, filed Nov. 25, 1997, entitled "Multi-Media Copy Management System", and U.S. Pat. No. 6,792,542, issued on Sep. 14, 2004, entitled "'Digital System for Embedding A Pseudo-Randomly Modulated Auxiliary Data Sequence in Digital Samples". Other systems for providing embedded information may also be adapted for use with the present invention.

Generally, the term "embedding" is meant to indicate that ancillary, or auxiliary data, is provided in a host waveform, or primary data signal, without substantially interfering with the primary data signal. For example, embedded data should not be audible when embedded in an audio signal. Typically, the data rate of the embedded data is much lower than that of the primary data signal.

For example, U.S. Pat. No. 5,822,360 discloses a technique for embedding data by modulating a spread spectrum signal. The spread spectrum signal has a relatively low noise power, but can be recovered at a special decoder by correlating the received signal with the pseudo-noise (PN) sequence used for spreading at the encoder.

Techniques for embedding data often require computationally intensive time-domain or frequency domain analyses that take advantage of human hearing and vision characteristics, e.g., to allow data to be embedded in audio and video data, respectively. The embedded data can therefore be made essentially imperceptible, while establishing a useful hidden data channel within the primary data signal.

With the present invention, the sophisticated, computationally intensive embedding techniques may take place in a pre-processing step, prior to the time when the content must be immediately available for delivery to users. The logical values can be thus be embedded using the most sophisticated techniques available, yet the content is immediately available for downloading or broadcasting to users. In a memory 322, the content segments with the embedded binary zeros are stored in memory portion 325, while the content segments with the embedded binary ones are stored in memory portion 330. It should be appreciated that if more than two logical values are embedded, memory portions can be provided for each value. Moreover, in practice, a library of content, e.g., including songs, movies, computer games, and the like, may be stored at the functions 325 and 330.

The memory 322 may be associated with a web server, for example.

For transmission of live events, or when it is desired to pass-through content that is received (via path 318) at the pre-processing module 310 to the user without delay, the memory 322 may only act as a buffer, e.g., to even out data rate variations and account for processing time at the data embedding module 210.

The on-line distributor 350 may maintain a database 360, including available identification numbers 362, and user records 364. The available identification numbers may simply be successive numbers, or other codes. In practice, the available identification numbers function 362 may maintain only a current order (or user) number, which is then incremented for each new order (or user). The user records function 364 maintains a record of the identification number that is associated with each user or order. The term "order" is meant to encompass users request for free samples, promotional giveaways, contests and the like, as well as paid purchases of content.

When a user request is received at a control 365, or control data is received via a communication path 352 (which may be the same or different than path 318), an identification number or code is associated with the user or order, and a record thereof is written at the user record function 364. Consequently, when content that has been illicitly copied is found, it will be possible to locate the user that originally obtained the content.

The identification number or code may also identify the on-line distributor or other entity, such as a copyright holder of the content, or may provide a registration number for an industry policing organization, for example.

Moreover, while copy protection is a primary goal of the invention, it will be appreciated that the embedded data may be used for essentially any purpose, in particular, if the user has a receiver that can read the data. For example, the embedded data may identify the on-line distributor or other entity, be used for awarding prizes to users, providing electronic coupons, and so forth. A corresponding receiver can read the embedded data and, e.g., display the corresponding information for the user.

At the user's premises 395 or other location, the user may order and/or receive the content using a personal computer (PC) 396, television set-top box 397, or any other available means.

In response to a user request or control data via path 352, the control 365 provides the identification number or code to a selector 370 as a selection signal to select the different segments with the embedded logical values from the functions 325 and 330 on a time-multiplexing basis, e.g., using a multiplexer (MUX) 375. The selector acts as a switch that allows successive segments from either the function 325 or 330, but not both at the same time, to be delivered to the user, as a composite data signal.

The term "successive" is used herein is understood to include both adjacent and non-adjacent segments which follow one another.

The selection signal generally can be a binary identification signal, or a signal derived from the identification signal. Cryptographic techniques may be used for this purpose (e.g., to transform the identification signal to a selection signal, or vice versa).

At the user premises, an appropriate capability is provided to decrypt the received data.

The control 365 may also make a record indicating that the content was delivered without errors if a bi-directional capability is provided. The time and date of the delivery may also be recorded, e.g., at the user records 364. The information embedded in the composite data signal may also indicate the time and date of the delivery.

The delivered content is provided to the user for storage, e.g., at the PC 396 or set-top box 397. The same or different communication channels can be used for the upstream request signal and the downstream delivery. As an example of using different channels, the upstream request may be provided via. a telephone network, while the downstream delivery is provided via a television network.

If sufficient bandwidth is available, the content may be delivered to multiple users at the same time using separate signals with the unique identification numbers embedded therein. When bandwidth is limited, and the number of users is large, such as for a multicast, the system of FIG. 6, discussed below, may be used.

Figure 4:
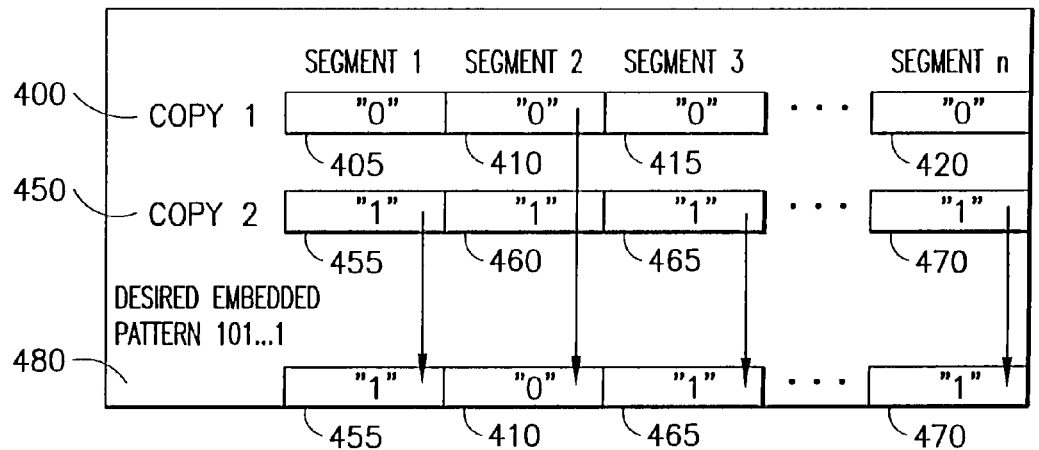
FIG. 4 illustrates the selection of data segments with embedded binary data in accordance with the present invention.

FIG. 4 illustrates the selection of data segments with embedded binary data in accordance with the present invention. A first copy 400 of content includes successive segments, e.g., SEGMENT 1 (405), SEGMENT 2 (410), SEGMENT 3 (415), . . . , SEGMENT N (420). Each segment has a logical value, which is a binary zero in the present example, embedded therein. Not every segment need have a value embedded into it. In fact, a further security element may be achieved with the present invention by selecting only particular segments to embed data, e.g., according to a pseudorandom signal, such as a PN sequence. Moreover, the embedded values may be provided in a scrambled order according to any known cryptographic technique to discourage manipulation of the data by an attacker. The corresponding information must be provided to a decoder to reverse the scrambling or encryption.

A second copy 450 of the same content includes successive segments corresponding to the first copy 400, e.g., segment 1 (455), segment 2 (460), segment 3 (465), . . . , segment N (470). Each segment has a logical value, which is a binary one in the present example, embedded therein.

For example, if the content is an audio track, each segment may comprise a specific duration of the track, e.g., corresponding to one or more frames of data.

A composite data signal 480 is formed by selecting segments from the first and second copies according to a desired embedded bit pattern. For example, if the desired embedded bit pattern is 101 . . . 1, then segment I (455) from copy 2 (450) should be selected, followed by segment 2 (410) from copy 1 (400), followed by segment 3 (465) from copy 2 (450), . . . , followed by segment N (470) from copy 2 (450). The composite data signal 480 therefore has the desired bit pattern 101 . . . 1 embedded therein.

A final, composite copy is thus constructed by selecting previously-created segments from either the first or second copies of the audio data with the embedded binary information.

As mentioned, the binary data sequence may identify a user who is downloading the content via a network, or provide other information. In this case, the composite data signal may be assembled in response to the user's purchase of the content.

The overall effect is that the consumer does not know the state of the information embedded into the composite data signal since the final copy received is perceptually identical to the same content from another copy that does not have embedded data. For audio data, this result is achieved by providing the embedded data at a power level such that it is inaudible when the audio data is recovered and played. The embedded data may also be spectrally shaped according to the audio spectrum to further enhance concealment.

For video data, the embedded data may be provided at a power level such that it is not visible when the video data is recovered and displayed.

Figure 5:
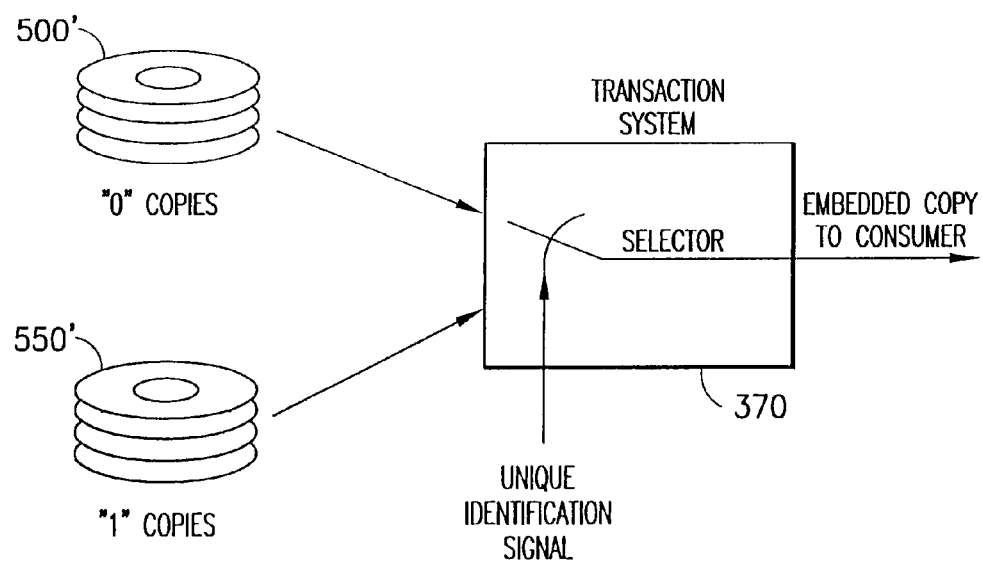
FIG. 5 illustrates the selection of content according to an identification signal in accordance with the present invention.

FIG. 5 illustrates the selection of content according to an identification signal in accordance with the present invention. The copies of content with binary zeroes and ones embedded therein are shown generally at 500' and 550', respectively. A transaction system includes a selector 500 which selects segments from the copies according to a unique identification signal, as discussed previously in connection with the selector 370 of FIG. 3.

The composite data signal may comprise audio, video (moving or still images), computer games, or other content. The advantage of using a binary signal is that only two logical values exist, so only two copies of the content need be stored. If an M-ary signaling scheme is used, such as M-level pulse amplitude modulation (PAM), M copies of the content with embedded data are prepared.

A constant data rate can be used for the embedded information. This provides for a more universal description, but is not a specific limitation on the system. Using this convention allows a binary digit to be applied to a specific section (e.g., segment) of audio or other content, namely in the form of a specific number of audio samples for each segment.

For example, digital audio found on compact discs (CDs) operates at a rate of 44,100 samples per second. In this case, for example, 1,000 samples per segment of audio may be used for each binary digit of the embedded information. That is, one bit of embedded information is distributed over 1,000 audio samples. Each segment, such as discussed in connection with FIG. 4, will therefore comprise at least 1,000 samples. This means that a copy of the desired audio can convey approximately 44 bits of embedded (e.g., auxiliary) information per second.

The first and second copies of the audio data are encoded with a "0" or "1", respectively, in every 1,000 sample segment. Otherwise, the copies have identical audio content. That is, the same audio data is provided in the corresponding segments.

Figure 6:
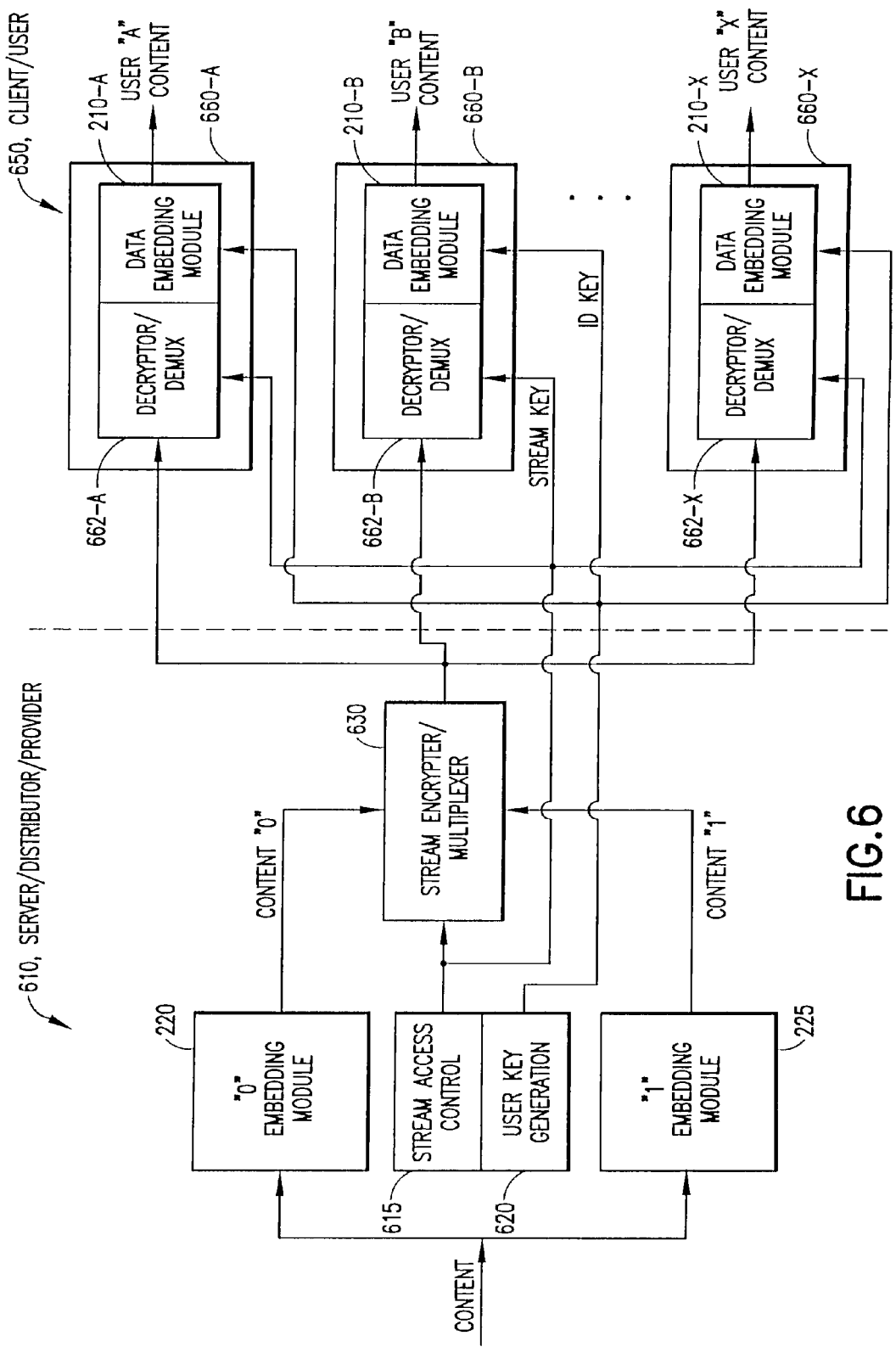
FIG. 6 illustrates a second embodiment of a data embedding system in accordance with the present invention.

FIG. 6 illustrates a second embodiment of a data embedding system in accordance with the present invention. This embodiment is particularly suitable for multicast transmissions to a user population, e.g., for a live event.

Here, the preprocessors (e.g., "0" embedding module 220, and "1" embedding module 225) reside on the content server/distributor/provider side 610, while the transaction system (e.g., data embedding module) resides on a client/user side 650. The "0" and the "1" streams from the modules 220 and 225, respectively, are "packaged" by a Stream encryptor/multiplexer unit 630 into a single stream, which is delivered to a number of user terminals 660-A, 660-B, . . . , 660-X. Alternatively, the "0" and the "1" streams may be provided to the user terminals in separate data streams.

For example, the terminals may be set-top boxes (e.g., decoders) or personal computers coupled to a cable television network, and receive the content with television or other signals.

The content with the embedded logical values is encrypted at the function 630 according to a stream key provided by a stream access control function 615. The use of cryptographic keys is believed to be within the purview of the ordinary practitioner and is therefore not discussed in extensive detail herein.

Only the properly authorized user can obtain a stream key from the stream access control unit 615 to restore the two streams at the respective decryptor/demultiplexer 662-A, 662-B, . . . , 662-X. In addition, the users will also receive an identification (ID) value from a user key generation unit 620. At the respective data embedding modules 21 O-A, 21 O-B, . . . , 21 O-X, the ID will be embedded into the content, as discussed in connection with FIGS. 2-5. Both the stream key and the ID value can be provided at the terminals 660-A, 660-B, . . . , 660-X various means, e.g., by installation at the time of manufacture of the terminals, local installation at the terminal such as by using smart card (with periodic renewal), or by secured transmission to the terminals (using the same or different communication path as the multicast content).

The ID value is embedded real-time at the data embedding modules 210-A, 210-B, . . . , 210-X on the user's side to generate the user-specific content. To deter piracy, various mechanisms Can be used to ensure the tightly coupled structure of the decryptor/Demux and the data embedding modules so that the "1" and the "0" streams, as well as the ID value~ are not accessible in the clear on the client/user side 650. For example, the "1" and the "0" streams can be swapped pseudo-randomly at frame boundaries. Additionally, the ID value can be scrambled in advance in a corresponding manner so that the correct ID value is encoded at the data embedding modules without revealing the ID value itself. This ensures the security of the streams themselves during storage or distribution, and, at the same time, the ID value is secure even after decryption.

This implementation is particularly suitable for applications where the content provider wants to minimize distribution channel bandwidth utilization, e.g., during the distribution of the content using pay-per-listen or pay-per-view in a cable network. The cable operator needs only to allocate the bandwidth for the "1" and "0" streams. The users' terminals 660-A, 660-B, . . . , 660-X, will generate content which is uniquely marked by the corresponding data embedding module 210-A, 210-B, . . . , 210-X. This helps to deter the users from illegally copying and redistributing the content.

In a further refinement, bandwidth need not be allocated for the two streams at all times. For example, the distributor can choose a particular segment of the content, and transmit both the "0" and "1" streams to the users, and during other times, transmit only the "0" or "1" streams, or even the unmarked content.

FIGS. 7(*a*) and 7(*b*) illustrate multiple layer data embedding in accordance with the present invention. Multiple, independent streams of data, referred to as data layers, can be embedded in the same content. The present invention can be adapted for use with multi-layer embedding schemes, such as disclosed in the aforementioned U.S. Pat. No. 5,822,360. Note that the embedding of the different user data (User Data X and Y) can use either identical or dissimilar data embedding technology, although there are advantages to using identical technology, such as ease of frame synchronization.

Applications of multi-layer data include providing separate user data streams for tracking, hyperlinks, or electronic coupons, for example.

Figure 7A:
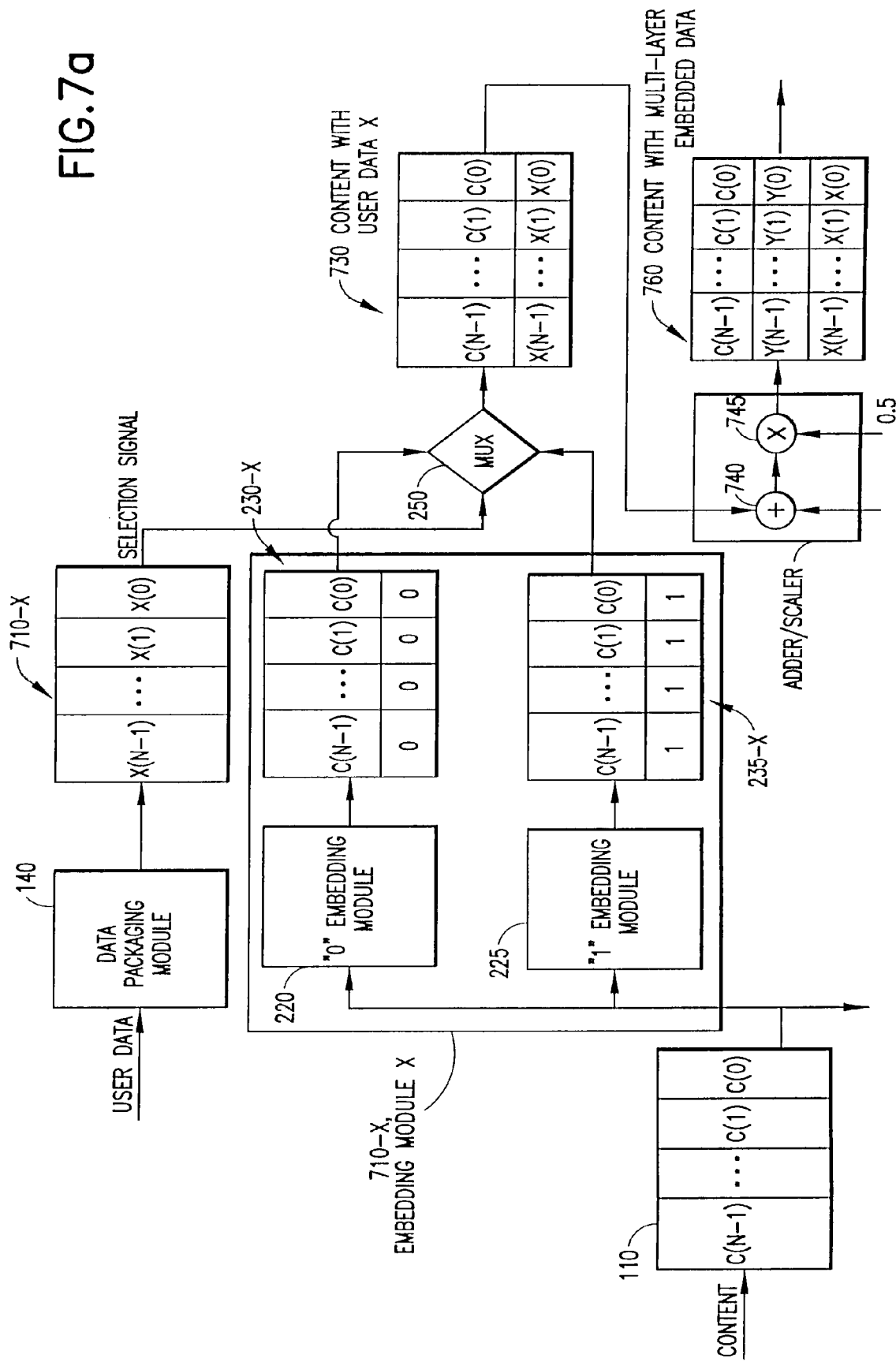
FIGS. 7(a) and 7(b) illustrate multiple layer data embedding in accordance with the present invention.

As shown in FIG. 7(a), a first stream of user data, e.g., User Data X, is processed by the data packaging module 140 to provide the corresponding binary user data, shown generally at 710-X with frames X(N-I), . . . , X(1), X(0).

At the embedding module 710-X, the "0" embedding module 220 and "1" embedding module 225 are used as discussed previously to provide the target streams 230-X and 235-X, respectively. The streams 230-X, 235-X are provided to a mux 250 to obtain the content stream 730 with the user data X embedded therein.

Figure 7B:
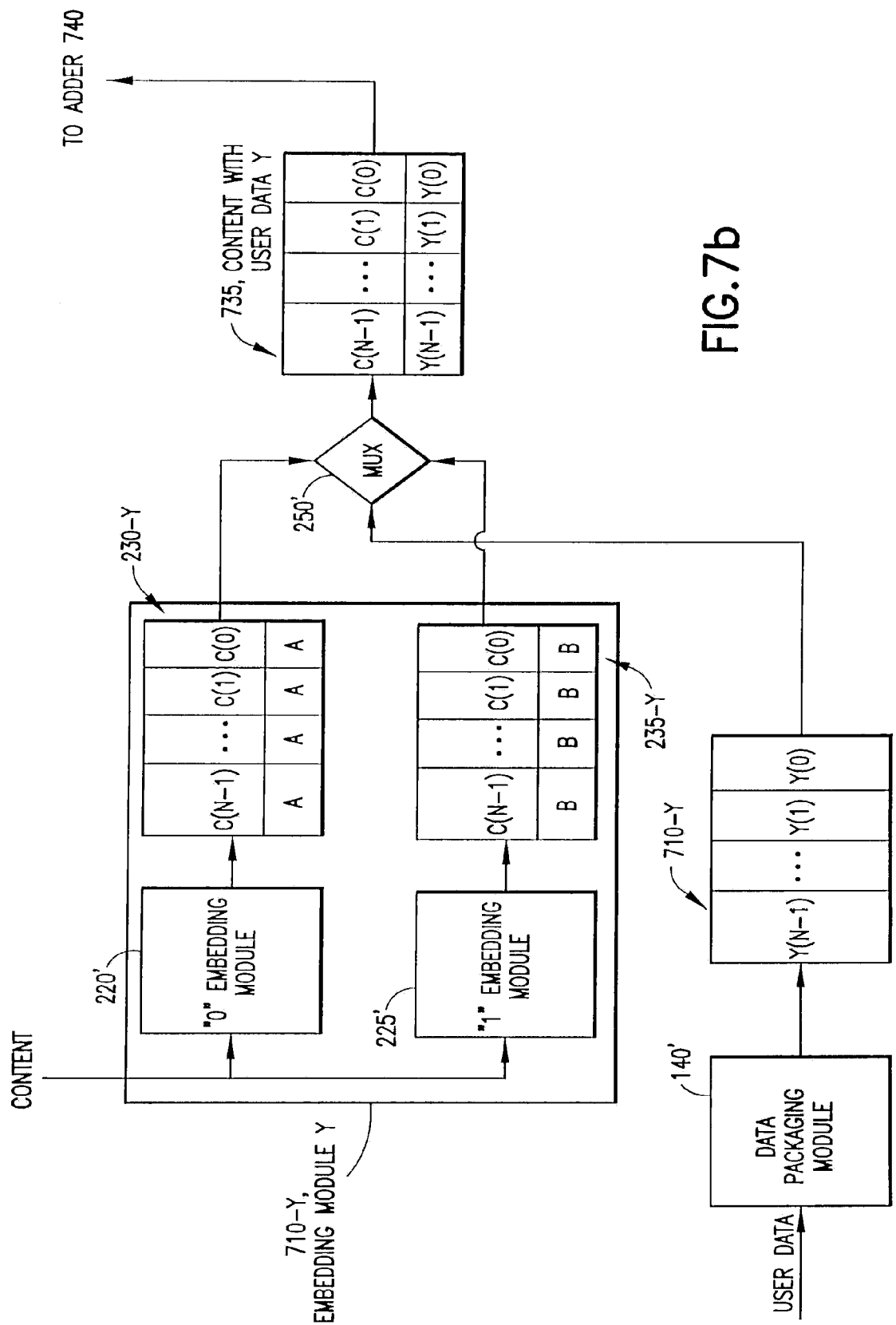

Similarly, as shown in FIG. 7(b), a second stream of user data, e.g., User Data Y, is processed by the data packaging module 140' to provide the corresponding binary user data, shown generally at 710-Y with frames Y(N-I), . . . , Y(1), YeO).

At the embedding module 710-Y, the "0" embedding module 220' and "1" embedding module 225' are used as discussed previously to provide the target streams 230-Y and 235-Y, respectively. The streams 230-Y, 235-Y are provided to a mux 250' to obtain the content stream 735 with the user data Y embedded therein.

Referring again to FIG. 7(a), the streams 730, 735 are combined at an adder 740 and scaled at a scaler 745 to provide the data stream 760 with multilayer embedded data. For example, a scaling factor of 0.5 may be used when there are two content streams with different user data. The scaler 745 essentially provides the amplitude of the content and user data in the stream 760 at the same level as in the streams 730, 735.

Note that more than two layers of embedded user data may be used, in which case the scaler 745 is adjusted according to the number of layers used.

Figure 8A:
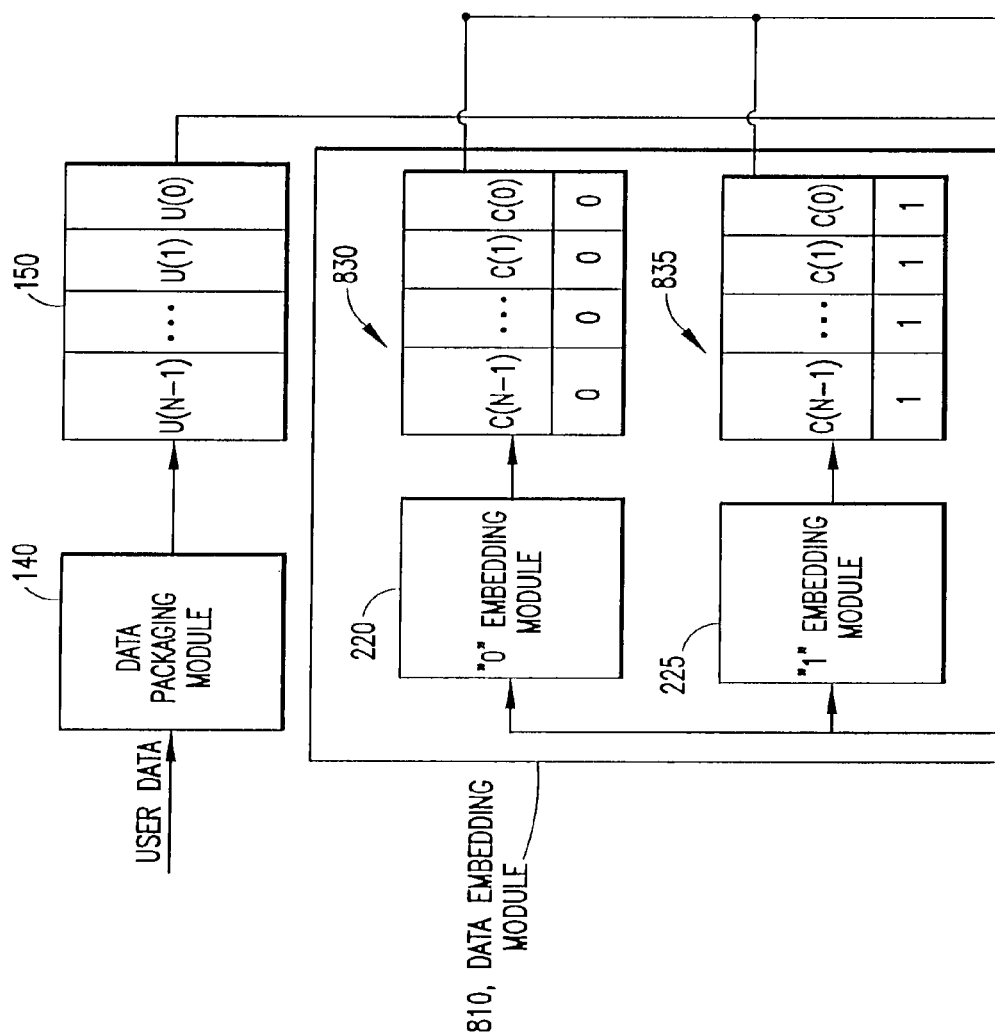
FIGS. 8a and 8b illustrates multi-level, non-binary data embedding in accordance with the present invention.
Figure 8B:
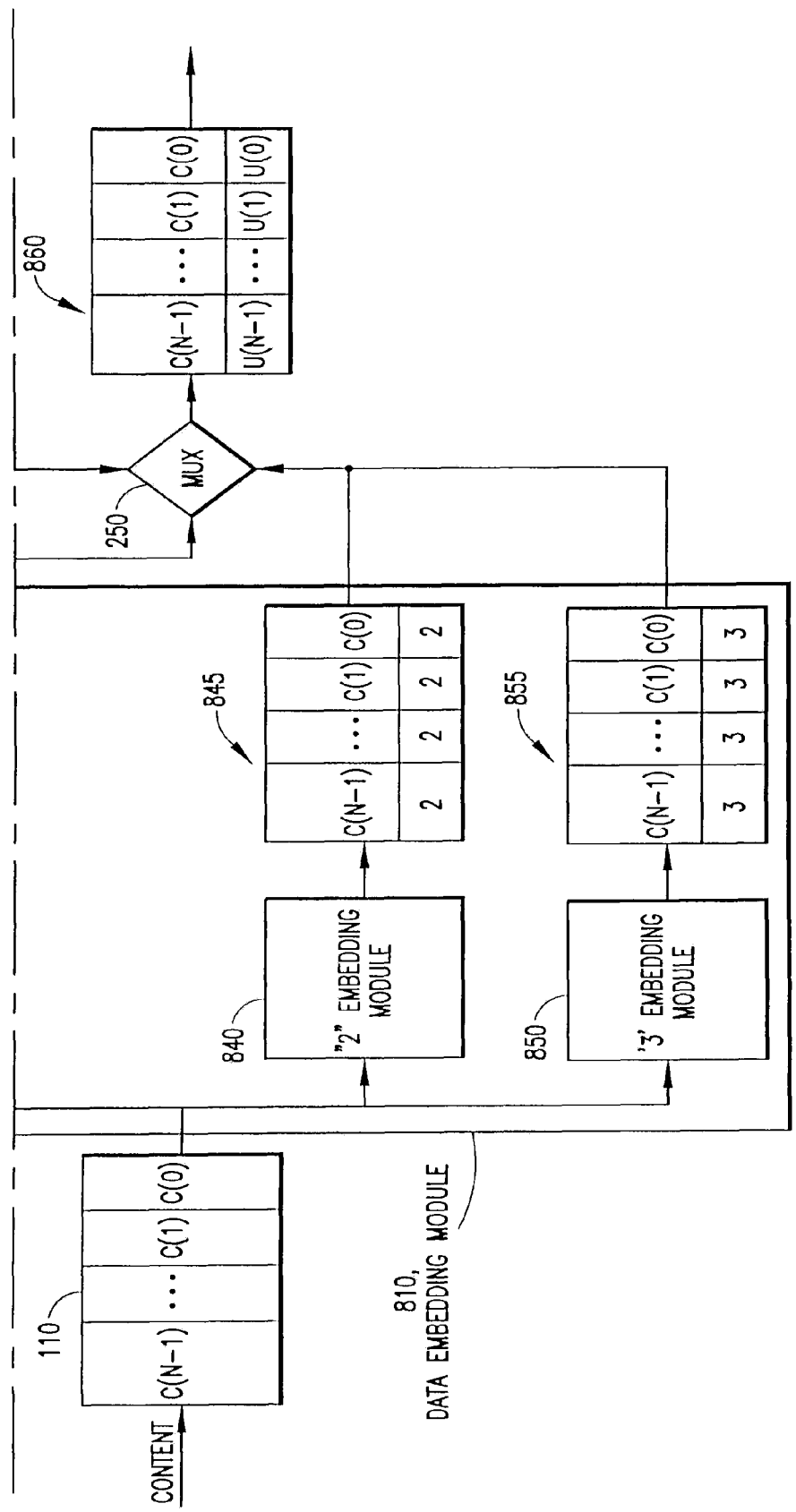

FIGS. 8a and 8b illustrate multi-level, non-binary data embedding in accordance with the present invention. The system can be extended to the embedding of multi-level (non-binary) value data. With M levels, the system is termed M-ary, with M≧2. For illustration purpose, a system with data of four (M=4) distinct logical value (0,1,2,3) is presented. It should be appreciated that all multi-level variations can be realized as a parallel combination of binary data embedding.

An M=4 level data embedding module 810 includes a "0" embedding module 220 for embedding logical "zero" values (see FIG.8a), a "1" embedding module 225 for embedding logical "one" values (see FIG. 8a), a "2" embedding module 840 for embedding logical "two" values (see FIG. 8b), and a "3" embedding module 850 for embedding logical "three" values (see FIG. 8b),to provide the respective data streams 830, 835, 845 and 855. The data streams 830, 835, 845 and 855 are provided to a mux 250 to provide the content data stream 860 with the multilevel user data embedded therein. As discussed previously, the mux 250 outputs successive frames of data with the desired logical values embedded therein, e.g., under the control of the user data stream 150.

Figure 9:
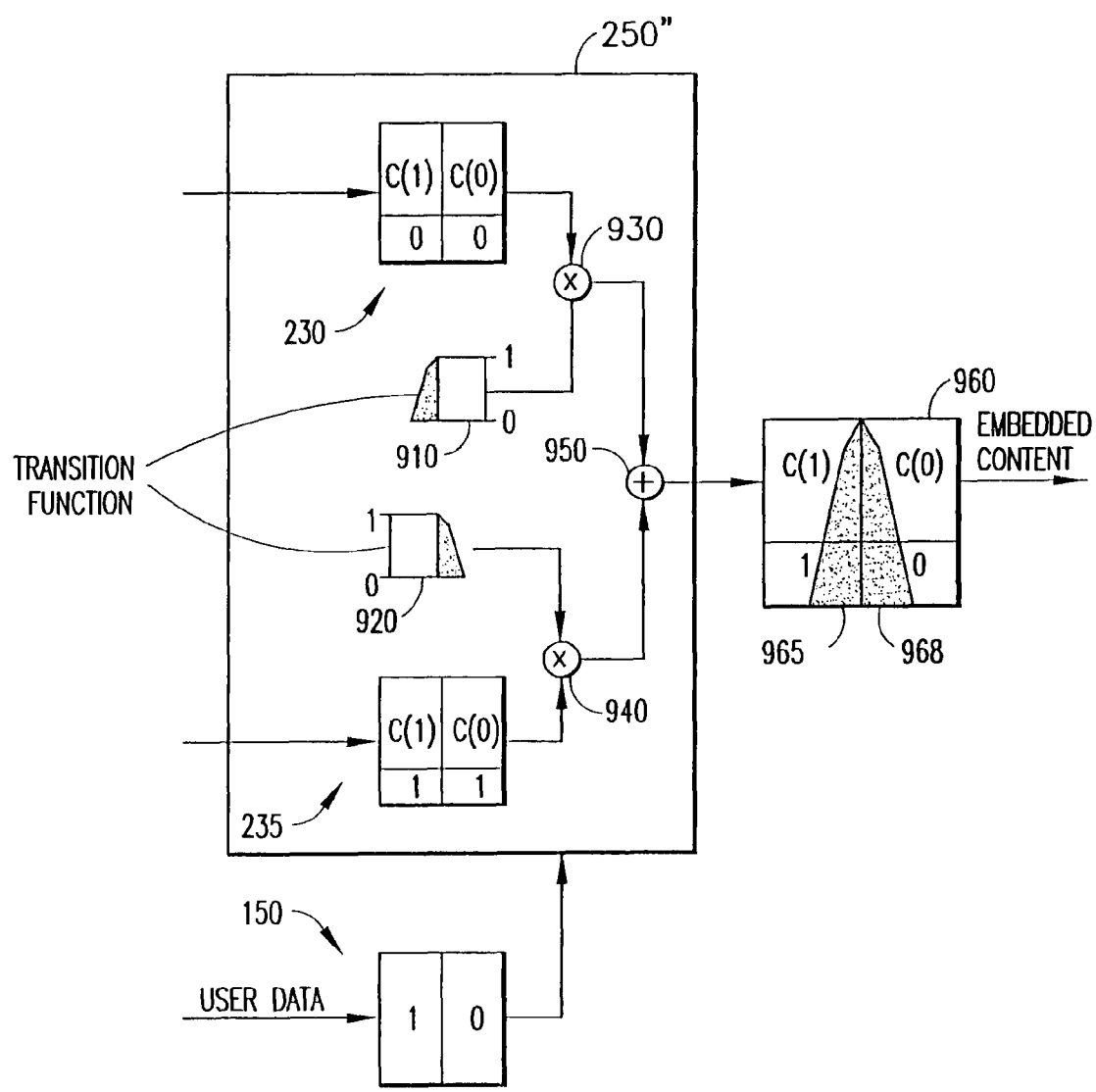
FIG. 9 illustrates a multiplexer with a transition function in accordance with the present invention.

FIG. 9 illustrates a multiplexer with a transition/fade function in accordance with the present invention. To ensure a smooth transition at the frame boundary, an explicit window/fade-in/fade-out may be performed at the multiplexer 250". The multiplexer 250" may be used, e.g., in place of the multiplexers 250 or 250' discussed herein.

When splicing (e.g., time-multiplexing) frames from different data streams, the content signal may not be continuous at the boundary between the frames. This can result in artifacts, e.g., audible artifacts for audio content, or visible artifacts for video content. A transition period can be provided as discussed herein, in connection with FIGS. 9 and 10, to avoid these effects.

The transition period is typically shorter than the frame length. For example, with a frame length of 2000 samples, the transition length may be 100-200 samples.

The transition function can be a fixed function, such as a linear ramp or an exponential decay, or an adaptive function that dynamically adjusts its characteristics based on the host signals. The objective is to ensure that the transition does not produce any artifacts which affect the subjective quality of the target content.

The target embedded streams 230 and 235, with the embedded logical zero and one values, respectively, are multiplied at multipliers 930 and 940 with transition functions 910 and 920, respectively. The transition function 910 is shown ramping (in two steps) from zero to one. When the transition function 910 reaches one, the transition function 920 begins ramping down (in two steps) from one to zero. The outputs of the multipliers 930 and 940 are combined at an adder 950 to provide the embedded content 960.

The embedded content 960 is shown including a first frame C(1) and a second frame C(0). The effect of the transition function 910, 920 transition region is shown diagrammatically at regions 965, 968, respectively.

Figure 10B:
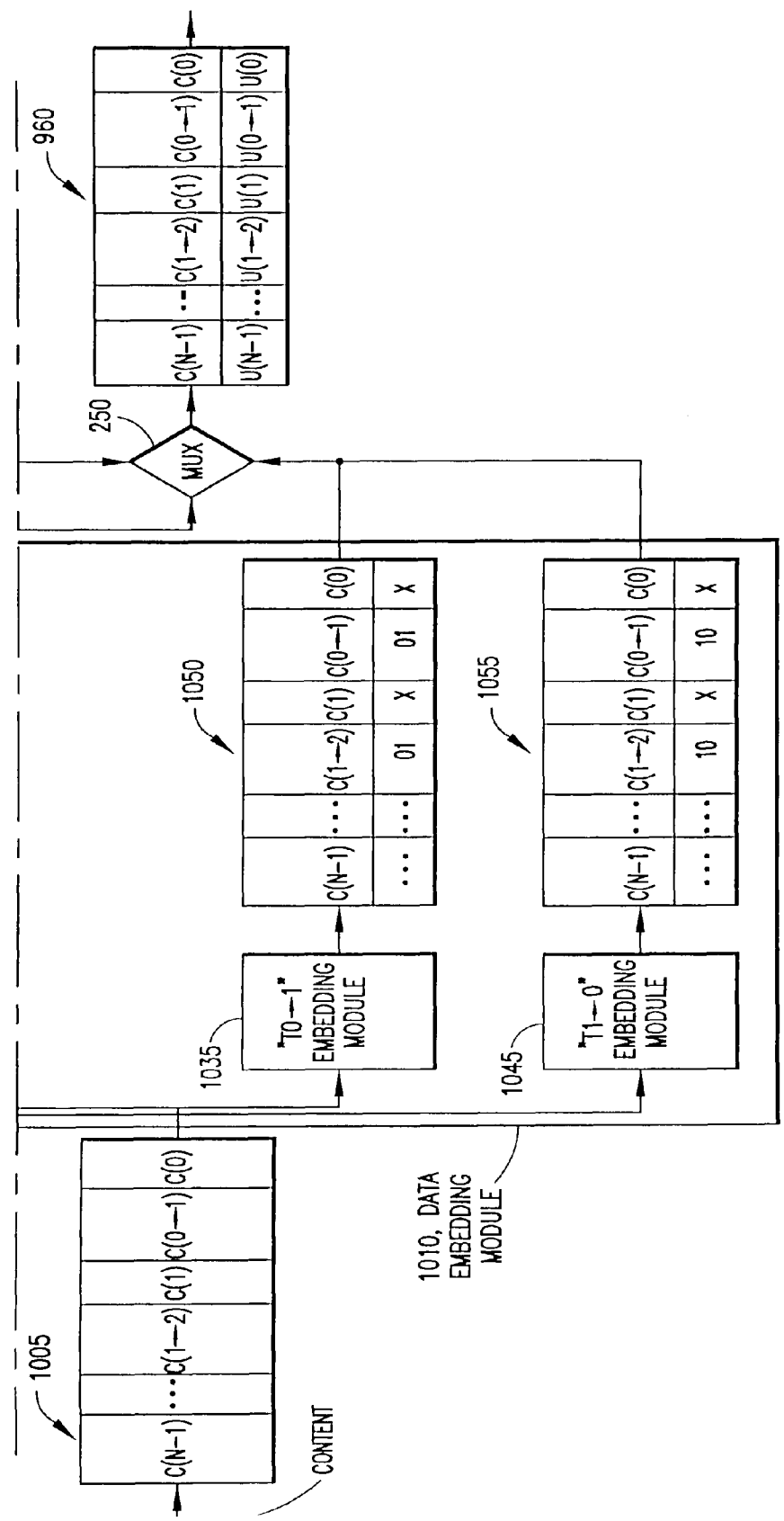

FIGS. 10a and 10b illustrate a system for transition control between two streams in accordance with the present invention. Another approach to ensuring a smooth transition at frame boundaries is to provide additional transition streams. This avoids the need for the mux 250" of FIG. 9 by providing data streams that are pre-processed (e.g., pre-smoothed) with a transition function, such as the function 910, 920 of FIG. 9. Then, to assemble the final target stream, the pre-processed frames can be time multiplexed as discussed previously, e.g., using the mux 250 or250'.

Here, user data frames U(N-1), . . . , U(1→2), U(1), U(0→1), U(0) are provided. U(1→2) denotes a transition frame between frames U(1) and U(2), while U(0→1) denotes a transition frame between frames U(0) and U(1).

The "0" data embedding module 220 (see FIG. 10a) provides the content frames 1030 with embedded logical "zero" values 1030, while the "1" data embedding module 225 (see FIG. 10a) provides the content frames 1035 with embedded logical "one" values.

Additionally, first and second transition streams, 1050 and 1055, are generated at embedding modules T0→1 (1035) and T1→0 (1045) (see FIG. 10b).

Note that the embedded frames marked with an 'X' do not need to be generated since they are never selected for target content generation. This is true since the transitions are always confined to the transition frames, e.g., C(0→1), C(1→2), etc.

The final target content stream 960, including the transition frames C(1→2) and C(0→1), is output from the mux 250 based on the selection signal from the user data stream 1020.

Several other variations are possible for the present invention, including:

Using the pre-processed embedding system with compressed content. That is, embedding the binary data into compressed audio, video or other digital data;

Using unequal length segments or variable data rates;

Basing the segment boundaries on error correction boundaries, packet boundaries, or other signal-specific construct;

Structuring the unique identification (ID) value, or adding redundancies (e.g., error correction or error checking) to deter collusion attacks. An example is the use of one PN sequence for "0" and another PN sequence for "1", rather than binary phase shift keying (BPSK), which uses one PN for both "0" and "1".

Accordingly, it can be seen that the present invention provides a system for providing a composite data signal to a user with embedded information that identifies the user.

In an embodiment which is particularly suitable for on-line distribution of content, two copies of the content may be pre-processed and stored, e.g., at a server used by an on-line distributor. Each copy has data embedded in successive segments therein that indicates a logical value, such as a binary zero or one. The segments are assembled according to a desired identification signal to provide a composite signal that is delivered to the user. In the event of illicit copying or distribution of the content, the original user can therefore be tracked from the illicit copies.

Optionally, instead of pre-processing and storing two copies of the content, the content can be processed and forwarded to the user on a real-time basis. This particularly desirable when the content is a live event.

In a further variation, which is particularly suitable for multicast transmissions to user terminals, data embedding modules are provided at the user terminals.

Moreover, while the embedding process is usually carried out in the digital domain, but once the information is embedded, it can be carried in the host signal in digital or analog form.

Although the invention has been described in connection with various specific embodiments, those skilled in the art will appreciate that numerous adaptations and modifications may be made thereto without departing from the spirit and scope of the invention as set forth in the claims.

What is claimed is:

1. A method, comprising:
processing one or more segments of a content, using a pre-processing device, to produce a first version of the segments of the content, the processing comprising modifying features of the segments of the content to represent a first embedded logical value, wherein
a distinct combination of a first set of segments from the first version of the segments of the content with a second set of segments from a second version of the content produces a copy of the content that conveys a particular identification code.

2. The method of claim 1, wherein at least a portion of the second version of the content is produced by modifying features of the content to represent a second embedded logical value.

3. The method of claim 2, wherein the first and the second embedded logical values represent at least one of: binary symbols and non-binary symbols.

4. The method of claim 1, wherein at least a portion of the second version of the content contains no embedded logical value.

5. The method of claim 1, wherein at least one of the first version of the segments of the content and the second version of the content is stored in a storage medium.

6. The method of claim 1, wherein the processing further comprises encrypting at least a portion of the first version of the segments of the content and the second version of the content.

7. The method of claim 1, wherein the first version of the segments of the content and the second version of the content are made available to a recipient to enable the production of the content that conveys a particular identification code.

8. The method of claim 1, wherein the copy of the content that conveys a particular identification code is produced prior to delivery of the content that conveys a particular identification code to a recipient premises.

9. An apparatus, comprising:
a pre-processor configured to modify features of one or more segments of a content to produce a first version of the segments of the content, the first version of the segments of the content representing a first embedded logical value, wherein
a distinct combination of a first set of segments from the first version of the segments of the content with a second set of segments from a second version of the content produces a copy of the content that conveys a particular identification code.

10. The apparatus of claim 9, wherein at least a portion of the second version of the content is produced by modifying features of the content to represent a second embedded logical value.

11. The apparatus of claim 10, wherein the first and the second embedded logical values represent symbols selected from a group consisting of: binary symbols and non-binary symbols.

12. The apparatus of claim 9, wherein at least a portion of the second version of the content contains no embedded logical value.

13. The apparatus of claim 9, further configured to store at least one of the first version of the segments of the content and the second version of the content in a storage medium.

14. The apparatus of claim 9, further configured to encrypt at least a portion of the first version of the segments of the content and the second version of the content.

15. The apparatus of claim 9, further configured to make available the first version of the segments of the content and the second version of the content to a recipient.

16. A method, comprising:
receiving first and second versions of segments of a content, the first version of the segment having been produced by modifying features of the content to represent a first embedded logical value; and
combining, using a combiner device, a first set of segments from the first version of the segments with a second set of segments from the second version of the segments to produce a copy of the content that conveys a particular identification code.

17. The method of claim 16, wherein at least a portion of the second version of the segments has been produced by modifying features of the content to represent a second embedded logical value.

18. The method of claim 17, wherein the first and the second embedded logical values represent at least one of: binary symbols and non-binary symbols.

19. The method of claim 16, wherein at least a portion of the second version of the segments contains no embedded logical value.

20. The method of claim 16, wherein the combining is carried out at a distributor of the content.

21. The method of claim 16, wherein at least one of the first and second versions of the segments is received via at least one of:
a data storage medium;
a multicast transmission session;
an Internet connection; and
a set-top box.

22. The method of claim 16, wherein at least a portion of the first and second versions of the segments is received in encrypted format.

23. The method of claim 16, wherein the combining is carried out in accordance with a code.

24. The method of claim 23, wherein the code is cryptographically encoded.

25. The method of claim 23, wherein the code is associated with at least one of:
- a request for the content;
- a transaction associated with the content;
- a device accessing the content;
- a recipient of one or more versions of the content;
- a distributor of the content;
- a device located at the premises of a recipient of one or more versions of the content;
- a holder of a property right to the content;
- a value installed, at the time of manufacture, in a device accessing the content;
- a value installed, using a secure transmission, in a device accessing the content; and
- a value installed in a device accessing the content that can be periodically renewed.

26. The method of claim 16, further comprising decrypting at least a portion of the first and second versions of the segments.

27. The method of claim 26, wherein the decrypting is carried out in accordance with a key.

28. An apparatus, comprising:
- a receiver configured to receive first and second versions of one or more segments of a content, the first version having been produced by modifying features of the content to represent a first embedded logical value; and
- a combiner configured to combine a first set of segments from the first version of the segments with a second set of segments from the second version of the segments to produce a copy of the content that conveys a particular identification code.

29. The apparatus of claim 28, wherein at least a portion of the second version of the segments is produced by modifying features of the content to represent a second embedded logical value.

30. The apparatus of claim 29, wherein the first and the second embedded logical values represent at least one of: binary symbols and non-binary symbols.

31. The apparatus of claim 28, wherein at least a portion of the second version of the segments contains no embedded logical value.

32. The apparatus of claim 28, wherein the receiver is configured to receive at least one of the first version and the second version of the segments of the content from at least one of:
- a data storage medium;
- a multicast transmission session;
- an Internet connection; and
- a set-top box.

33. The apparatus of claim 28, wherein the receiver is configured to receive at least one of the first version and the second version of the segments of the content in encrypted format.

34. The apparatus of claim 28, wherein the combiner is configured to select the first set of segments and the second set of segments in accordance with a code.

35. The apparatus of claim 34, wherein the code is cryptographically encoded.

36. The apparatus of claim 34, wherein the code is associated with at least one of:
- a request for the content; a transaction associated with the content;
- a device accessing the content;
- a recipient of one or more versions of the content;
- a distributor of the content;
- a device located at the premises of a recipient of one or more versions of the content;
- a holder of a property right to the content; a value installed, at the time of manufacture, in a device accessing the content;
- a value installed, using a secure transmission, in a device accessing the content; and
- a value installed in a device accessing the content that can be periodically renewed.

37. The apparatus of claim 28, further configured to decrypt at least a portion of the first and second versions of the segments of the content.

38. The apparatus of claim 28, wherein the apparatus is a device selected from the group consisting of: a personal computer, a set-top box and a video disc player.

39. A computer program product, embodied on a non-transitory computer-readable medium, comprising:
- computer code for accessing first and second versions of segments of a content, the first version of the segments having been produced by modifying features of the content to represent a first embedded logical value; and
- computer code for combining a first set of segments from the first version of the segments with a second set of segments from the second version of the segments to produce a copy of the content that conveys a particular identification code.

40. The computer program product of claim 39, wherein the non-transitory computer-readable medium is selected from a group consisting of: a hard disk drive and an optical disc.

41. An apparatus comprising:
- a processor; and
- a memory comprising processor executable code, the processor executable code, when executed by the processor, configures the apparatus to:
- access first and second versions of segments of a content, the first version of the segments having been produced by modifying features of the content to represent a first embedded logical value; and
- combine a first set of segments from the first version of the segments with a second set of segments from the second version of the segments to produce a copy of the content that conveys a particular identification code.

42. An apparatus, comprising:
- a processor; and
- one or more media storage devices responsive to commands from the processor, the one or more media storage devices comprising first and second versions of segments of a content, the first version of the segments having been produced by modifying features of the content to represent a first embedded logical value, the one or more storage media devices further comprising processor executable code that, when executed by the processor, configures the apparatus to:
- transmit the first and second versions of the segments in response to a request for the content such that combining a first set of segments from the first version of the segments with a second set of segments from the second version of the segments produces a copy of the content that conveys a particular identification code.

* * * * *

UNITED STATES PATENT AND TRADEMARK OFFICE
CERTIFICATE OF CORRECTION

PATENT NO. : 8,155,463 B2
APPLICATION NO. : 12/770633
DATED : April 10, 2012
INVENTOR(S) : Douglas Wong and Chong U. Lee Page 1 of 1

It is certified that error appears in the above-identified patent and that said Letters Patent is hereby corrected as shown below:

On Title Page 2, in Item (56), under "OTHER PUBLICATIONS", in Column 2, Line 5, please delete "Hybercube" and insert -- Hypercube --, therefor.

In the Specifications:

In Column 4, Line 64, please delete "illustrates" and insert -- illustrate --, therefor.

In Column 5, Line 1, please delete "illustrates" and insert -- illustrate --, therefor.

In Column 6, Line 38, please delete ""Digital" and insert -- "Digital --, therefor.

In Column 11, Line 51, please delete "8b),to" and insert -- 8b), to --, therefor.

In Column 12, Line 35, please delete "or250'." and insert -- or 250'. --, therefor.

Signed and Sealed this
Twenty-third Day of July, 2013

Teresa Stanek Rea
*Acting Director of the United States Patent and Trademark Office*